US008270957B2

(12) United States Patent
Franco et al.

(10) Patent No.: US 8,270,957 B2
(45) Date of Patent: Sep. 18, 2012

(54) METHOD FOR MANAGING A CONFERENCE CALL IN A TELEPHONE NETWORK

(75) Inventors: Dario Franco, Turin (IT); Marcello Sampo', Turin (IT); Agostino Cotevino, Turin (IT)

(73) Assignee: Telecom Italia S.p.A., Milan (IT)

(*) Notice: Subject to any disclaimer, the term of this patent is extended or adjusted under 35 U.S.C. 154(b) by 348 days.

(21) Appl. No.: 12/084,628

(22) PCT Filed: Nov. 7, 2005

(86) PCT No.: PCT/EP2005/055781
§ 371 (c)(1),
(2), (4) Date: Oct. 9, 2009

(87) PCT Pub. No.: WO2007/051493
PCT Pub. Date: May 10, 2007

(65) Prior Publication Data
US 2010/0035593 A1 Feb. 11, 2010

(51) Int. Cl.
*H04M 3/42* (2006.01)

(52) U.S. Cl. ........ 455/416; 455/456; 455/518; 709/204; 370/352; 370/260

(58) Field of Classification Search ............. 455/416, 455/456, 518; 709/204; 370/352, 260
See application file for complete search history.

(56) References Cited

U.S. PATENT DOCUMENTS

| 5,724,416 | A | 3/1998 | Foladare et al. |
| 6,148,068 | A * | 11/2000 | Lowery et al. ............. 379/202.01 |
| 6,721,409 | B1 | 4/2004 | Dell et al. |
| 6,839,417 | B2 * | 1/2005 | Weisman et al. ......... 379/204.01 |
| 2002/0107008 | A1 * | 8/2002 | Hendrey et al. ............... 455/416 |
| 2003/0138119 | A1 | 7/2003 | Pocino et al. |
| 2005/0213731 | A1 * | 9/2005 | Rodman et al. ........... 379/202.01 |
| 2007/0050451 | A1 * | 3/2007 | Caspi et al. .................... 709/204 |

FOREIGN PATENT DOCUMENTS

| EP | 0 580 397 A2 | 1/1994 |
| EP | 0 989 766 B1 | 3/2000 |
| EP | 1465 386 A1 * | 6/2004 |

* cited by examiner

*Primary Examiner* — Jinsong Hu
*Assistant Examiner* — Jean Chang
(74) *Attorney, Agent, or Firm* — Finnegan, Henderson, Farabow, Garrett & Dunner, L.L.P.

(57) ABSTRACT

A method of managing, in a telephone network, a conference call among a first terminal and a plurality of terminals, includes: setting up at least one voice channel for activating the conference call among the first terminal and the plurality of terminals; and causing deactivation of a microphone of at least one terminal of the plurality of terminals.

25 Claims, 9 Drawing Sheets

US 8,270,957 B2

METHOD FOR MANAGING A CONFERENCE CALL IN A TELEPHONE NETWORK

CROSS REFERENCE TO RELATED APPLICATION

This application is a national phase application based on PCT/EP2005/055781, filed Nov. 7, 2005, the content of which is incorporated herein by reference.

BACKGROUND OF THE INVENTION

1. Field of the Invention

The present invention relates to a method for managing a conference call in a telephone network, in particular, but not exclusively, in a mobile telephone network. The present invention further relates to a computer program, a conference call server and a terminal for implementing the method.

2. Description of the Related Art

Current telephone networks, either fixed or mobile, are adapted to provide their users with a plurality of telephone services, such as call screening, call answering service, or the like. Current telephone networks are also adapted to provide their users with a conference call service. Such a conference call service allows to set up a telephone call among a plurality of users, each user being connected to the telephone network through a respective terminal (either fixed or mobile).

U.S. Pat. No. 6,839,417 B2 discloses a method and apparatus to allow individuals to initiate, join, manage, and participant in a conference call. Each participant has a station, consisting of at least a telephone, a processor, a display written by the processor, and controls provide the participant with input to the processor. The telephone and processor are in communication with other participant stations via a conference server. The conference server is also responsible for providing, for each participant, a combination of the other participants' voices. When a speaker is designated, this combination ensures that the speakers voice is able to dominate the combination for each of the other participants. Even so, the other participants are still audible within the combination, and the other participants are preferably audible to the speaker.

A known conference call service includes an activation phase, which can be performed in different ways. For instance, a user (which will be termed in the following description "master user") who wishes to activate a conference call may call each user to be connected to the conference call (which will be termed in the following description "member user"). Alternatively, the master user may request the activation of a conference call, which will be performed in a centralized way, as it will be shown herein after.

According to this known conference call service, at the end of the activation phase, master user and member users are bi-directionally linked the one to the others. In other words, during the conference call, the terminal of each user participating to the conference call continuously transmits and receives signals through the common voice channel.

More particularly, during the conference call, the terminal of each user receives signals transmitted by the terminals of all the other users participating to the conference call. A signal transmitted by a listening user terminal only comprises environment noise (as it will be discussed herein after), while a signal transmitted by a speaker user terminal comprises both speech and environment noise.

The Applicant has perceived that this known conference call service has some drawbacks.

First of all, as each user (either master or member) who is participating to the conference call is bi-directionally linked to all the other users, he can start speaking whenever he wants. This could disadvantageously lead to a situation wherein more than one user speak at the same time, so that their speeches overlap and become hardly intelligible by the listening users.

Moreover, if a number of users is participating to a conference call by means of a single terminal (possibly by using the hands-free function of the single terminal), any comments that such users exchange with each other are transmitted to all the other listening users, thus overlapping to the speech of the speaking user, which could become hardly intelligible by the listening users.

Moreover, as each user participating to a conference call is located in a respective location (such as in his car, in his office or in his factory), during the conference call, as already mentioned, the terminal of each user continuously transmits an environment noise to the other users. Therefore, each listening user continuously receives an overlap of the speech transmitted by the speaker user and of the environment noises transmitted by the speaker user and by other listening users. If a user is located in a highly noisy environment, or if more than one user are located in a noisy environment, the overall environment noise level may be comparable to the speech level, so that the speech of the speaking user become hardly intelligible by the listening user.

This problem is particularly significant in case of conference call services in a mobile telephone network. Indeed, it is likely that one or more users participating to the conference call are located in a noisy location, such as on a street or on a car. Besides, in mobile telephone networks environment noise affects speech more severely than in fixed telephone networks, due to the fact that in mobile telephone networks signal coding (such as AMR coding, which is typically used in GSM telephone networks) uses less bits, thus implying a lower signal quality (speech intelligibility, speaker recognizability, or the like).

SUMMARY OF THE INVENTION

The Applicant has noticed that, due to the above mentioned drawbacks, conference call services currently offered by service providers allow to connect only few users to a conference call, even though current telephone networks would allow to connect some tens of users to a same conference call. For some applications, wherein the participation of a higher number of users would be required, this limit is unacceptable.

The Applicant has tackled the problem of providing a method and apparatus for managing a conference call in a telephone network, in particular (but not exclusively) in a mobile telephone network, which overcomes the aforesaid drawbacks.

According to a first aspect, the present invention provides a method of managing, in a telephone network, a conference call among a first terminal and a plurality of terminals, comprising: setting up at least one voice channel for activating the conference call among the first terminal and the plurality of terminals; and causing deactivation of a microphone of at least one terminal of the plurality of terminals.

In one embodiment, setting up at least one voice channel is performed by sending a conference call activation request by the first terminal and comprises sending the conference call activation request to a conference call server.

The conference call server may send a voice channel set up command for setting up the voice channel among the master terminal and the plurality of terminals, based on the conference call activation request.

Causing deactivation of the microphone of at least one terminal of the plurality of terminals may comprise sending a microphone deactivation command from the conference call server to the at least one terminal of the plurality of terminals.

Causing deactivation of microphone of at least one terminal of the plurality of terminals may comprise sending a microphone deactivation command from the first terminal to the at least one terminal of the plurality of terminals.

Sending a microphone deactivation command may be performed before or after setting up the voice channel among the first terminal and the plurality of terminals.

The conference call activation request may comprise a list including identifiers of users of the plurality of terminals. It may also comprise a conference call activation date and a conference call activation time. In this case, the at least one voice channel among the first terminal and the plurality of terminals is established at the conference call activation date and at the conference call activation time.

If one terminal of the plurality of terminals having its microphone deactivated sends an intervention request, the intervention request is processed, and the microphone of the terminal is activated in case the intervention request is accepted.

The intervention request may be processed by comparing it with an intervention end message previously sent by a terminal having its microphone activated.

Typically, the telephone network comprises a mobile telephone network, and the conference call activation request comprises an identifier of at least one cell of the mobile telephone network.

In one embodiment, at least one of the plurality of terminals, during the conference call, is enabled to always have its microphone active.

At least one of the plurality of terminals, during the conference call, may be not enabled to send the intervention request.

In one embodiment, all the terminals of the plurality of terminals have their microphone deactivated.

In one embodiment, the first terminal is enabled to have its microphone active.

According to a second aspect, the present invention provides a computer program comprising computer program code means adapted to perform all the steps of the above method when the program is run on a computer.

According to a third aspect, the present invention provides a conference call server adapted to execute the above computer program.

According to a fourth aspect, the present invention provides a terminal of a telephone network adapted to participate to a conference call between a first terminal and a plurality of terminals, the terminal comprising: a receiver module for receiving a microphone deactivation command or for receiving a microphone activation command from a conference call server of the telephone network; and an executing module for executing the microphone deactivation command or the microphone activation command.

The executing module may be adapted to enable a mute function of the terminal upon reception of the microphone deactivation command and it may be further adapted to disable the mute function of the terminal upon reception of the microphone activation command.

The transmitter module may be further adapted to transmit an intervention request and the transmitter may be further adapted to transmit an intervention end message.

The terminal may comprise a memory for storing a list of identifiers of the plurality of terminals which are to be connected to the conference call, and a list identifier associated to the list.

The receiver module may be further adapted to receive a participant list, the participant list comprising identifiers of terminals connected to the conference call.

BRIEF DESCRIPTION OF THE DRAWINGS

The invention will become more clear by the following detailed description, given by way of a non limiting example, to be read with reference to the accompanying drawings, wherein.

DETAILED DESCRIPTION OF THE INVENTION

Figure 1:
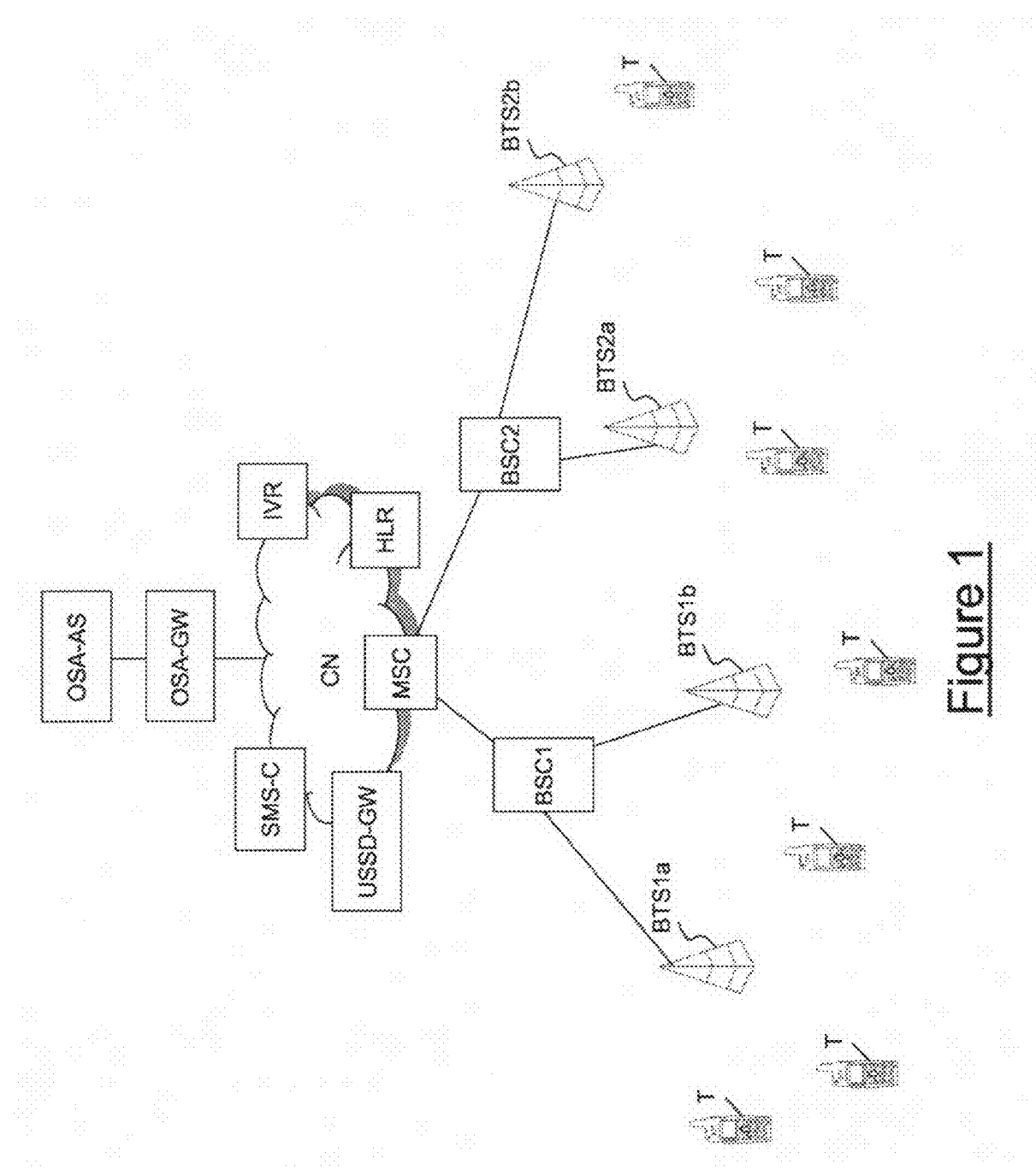
FIG. 1 schematically shows a first example of a known GSM telephone network, which is adapted to implement embodiments of the present invention.

FIG. 1 shows an exemplary mobile telephone network for implementing embodiments of the method of the invention. In particular, the network shown in FIG. 1 is a known GSM ("Global System for Mobile communications") telephone network. The method may be applied also to other types of telephone network, as it will be discussed herein after.

As it is known, a GSM telephone network is a cellular network. This means that a number of geographic areas are defined, which are termed "cells". Each user is provided with a respective mobile terminal, and he can move from a cell to the others. Mobile terminals located in a same cell are radio connected to a same base transceiver station, which is adapted to manage all the traffic coming from, and addressed to, the mobile terminals located in its respective cell.

In FIG. 1, by way of example, the GSM telephone network comprises four base transceiver stations BTS1a, BTS1b, BTS2a, BTS2b (for clarity reasons, the cells are not shown in FIG. 1). FIG. 1 also shows some mobile terminals T. In order to implement the method according to the present invention, such terminals T are provided with a suitable client application, as it will be discussed in further details herein after.

A known GSM telephone network further comprises a plurality of base station controllers, each base station controller being connected to a respective set of base transceiver stations. For instance, in FIG. 1 two base station controllers BSC1, BSC2 are shown. The base station controller BSC1 is connected to the base transceiver stations BTS1a, BTS1b, while the base station controller BSC2 is connected to the base transceiver stations BTS2a, BTS2b.

Further, a known GSM telephone network comprises a plurality of mobile switching centers. Such mobile switching centers are adapted to setup voice channels between two or more mobile terminals. FIG. 1 only shows a single mobile switching center MSC, which is connected to the base station controllers BSC1, BSC2.

Further, a known GSM telephone network comprises, as shown in FIG. 1, a home location register HLR, which comprises a list of all the users which are allowed to use the GSM telephone network. In the register HLR, each user is uniquely identified by his IMSI ("International Mobile Subscriber Identity"). Further, for each user, the register HLR comprises additional information such as a user profile (subscription type, subscribed services, or the like), a current geographic location and a current terminal status (accessible, not accessible, etc.)

A known GSM telephone network typically comprises additional apparatuses, for supporting particular telephone services. For instance, as shown in FIG. 1, a GSM telephone network typically comprises a Short Message Service center SMS-C, which is adapted to support a Short Message Service. Such a service enables a user or a service provider to compose a short text message and to send it to a destination user, who visualizes it on the display of his terminal.

Further, a GSM telephone network may comprise an Unstructured Supplementary Service Data gateway USSD-GW, as shown in FIG. 1. Such a gateway allows a user and a service provider to exchange with each other signaling USSD messages. Such signaling USSD messages typically comprise numbers and symbols such as "#" or "*". Such signaling USSD messages, for instance, may be employed by a user to ask a service provider information about his telephone bill, or the like.

Further, a known GSM telephone network may comprise an Interactive Voice Response device, indicated in FIG. 1 as IVR. Such a device is adapted to send voice announcements to users. Typically, the IVR device al also adapted to receive and process a predefined set of answers from such users. For instance, a Interactive Voice Response could send to a user a voice announcement comprising a list of options; the user may select the desired option by answering "yes" or "no".

Typically, a GSM telephone network which is adapted to support a plurality of telephone services is provided with apparatuses for developing and managing such telephone services. For instance, a GSM telephone network may comprise an Intelligent Network (IN) architecture, or an Open Services Access (OSA) architecture, as shown in FIG. 1. Such an OSA architecture comprises an application server OSA-AS, which is connected to the GSM telephone network by means of a suitable gateway OSA-GW, which acts as an interface between the application server OSA-AS and the mobile switching centers of the GSM telephone network. Therefore, a service provider may develop, configure, activate and manage services through the application server OSA-AS, without introducing substantial change in the core network (for instance without changing the configuration of any center MSC) or without providing any new network element. Data for implementing services are both distributed to, and collected from, users through the gateway OSA-GW. It has to be noticed that, in case the GSM network telephone comprises an IN architecture instead of an OSA architecture, the roles of the server OSA-AS and the gateway OSA-GW may be both played by a Service Control Point (SCP).

A known GSM telephone network may comprise further apparatuses, which are not shown in FIG. 1 as they are not relevant to the present invention, and which are generically referred to as CN (for "Circuit-switched Network").

The above described GSM telephone network is adapted to implement embodiments of the method according to the present invention, as it will be shown herein after by referring to FIGS. 5a, 5b, 6, 7, 8. In particular, network equipment and/or terminals of the network may implement embodiments of the method of the invention by specific software and/or hardware modules adapted to perform the method steps that will be described in the following. In particular, a terminal should be provided with a transmitter module for transmitting a conference call activation request; a receiver module for receiving a microphone deactivation command and/or for receiving a microphone activation command from a conference call server of the telephone network; and an executing module for executing the microphone deactivation command and/or the microphone activation command.

Figure 5A:
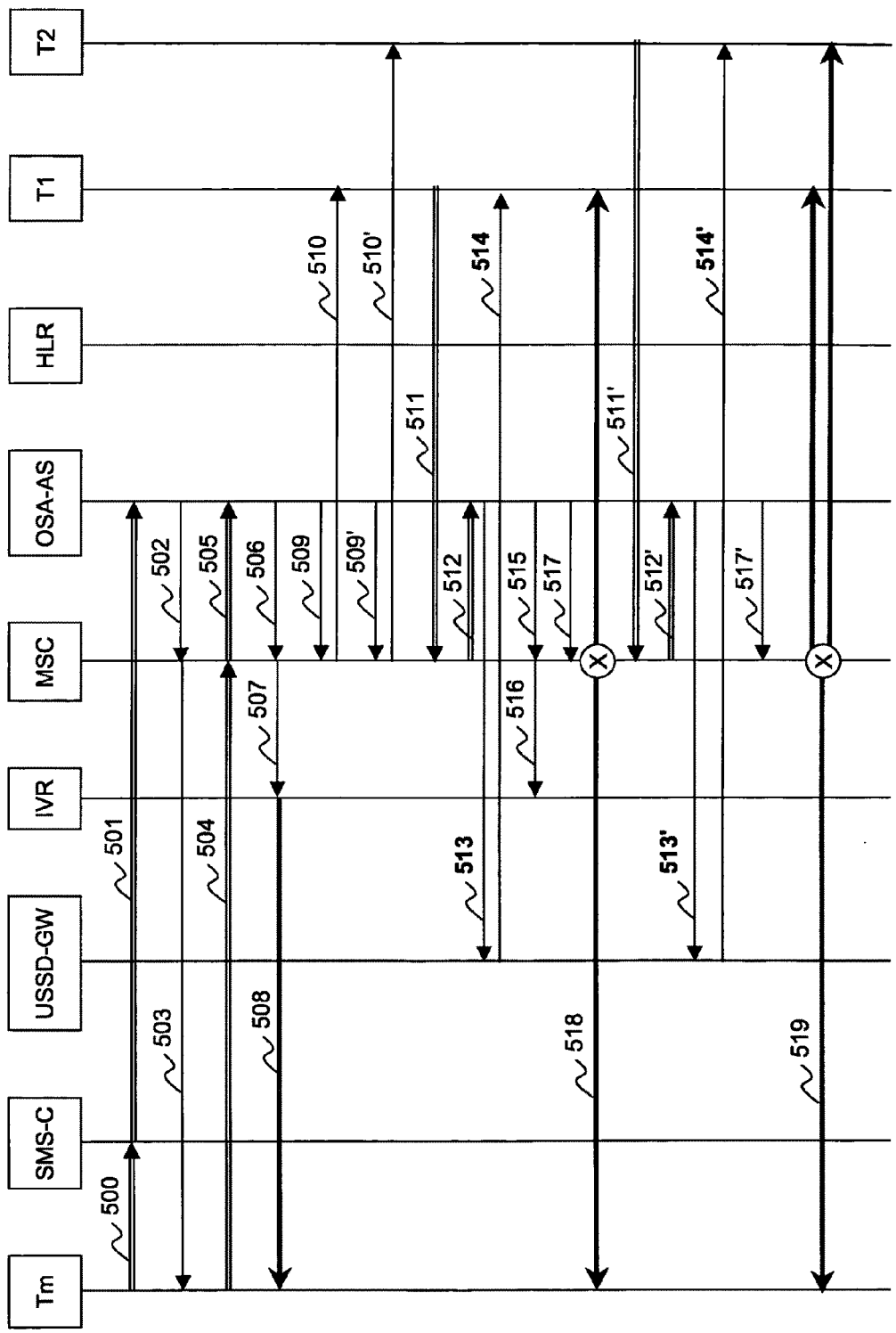
FIGS. 5a, 5b schematically show steps for activating a conference call according a first and a second alternative, in the telephone network of FIG. 1, according to embodiments of the present invention.

In particular, FIG. 5a schematically shows steps of a conference call activation phase in the GSM telephone network of FIG. 1, according to a first embodiment of the present invention.

In FIG. 5a, for clarity reasons, the gateway OSA-GW is not shown, as it is implicitly assumed that all signals exchanged between the application server OSA-AS and the center MSC pass through the gateway OSA-GW.

It is assumed that a master user of the network of FIG. 1 wishes to activate a conference call with a first member user and a second member user.

In FIG. 5a, the master user terminal is indicated as Tm, whilst the terminals of the first and of the second member users are termed T1, T2, respectively.

As already mentioned above, the conference call activation phase may be managed in a centralized way. In the embodiment of FIG. 5a, it is assumed that the activation phase is managed in a centralized way by the application server OSA-AS.

Therefore, for activating a conference call, the master user sends an activation request to the server OSA-AS. In the embodiment of FIG. 5a, such an activation request is in the form of an activation request SMS message. Alternatives are possible, as it will be shown herein after by referring to FIG. 5b.

Such an activation request SMS message may for instance comprise a keyword identifying the requested telephone service (for instance "CONF"). Further, the activation request SMS message may comprise an identifier list of the member users.

Alternatively, the master user may be able to store on his terminal Tm one or more predefined member lists. Possibly, each member list is associated to a list number. In this case, such member lists and their respective list numbers should be accessible also by the server OSA-AS (they can be stored either directly at the server OSA-AS, or in a dedicated database or server connected to server OSA-AS). Then, in this case, the activation request SMS message could simply comprise the keyword and the list number associated to the desired member list. Once such an activation request SMS message has been received, the server OSA-AS will read the list number and will consequently determine the member user identifiers.

In addition, the activation request SMS message could comprise further information. For instance, the activation request SMS message could comprise information about date and time at which the conference call should start. In this way, the master user informs the server OSA-AS that he wishes to activate a conference call at the date and time indicated in the activation request SMS message.

With specific reference to FIG. 5a, the activation request SMS message is sent by the terminal Tm to the center SMS-C (step 500), which forwards it to the server OSA-AS (step 501).

Upon receipt of the activation request SMS message, the server OSA-AS parses the message and determines the terminal from which the activation request SMS message has been sent, i.e. Tm. Then, the server OSA-AS calls the terminal Tm of the master user. For this purpose, the server OSA-AS sends a call request to the center MSC (step 502), which calls the terminal Tm (step 503). In case the activation request SMS message comprises information about conference call starting date and time, steps 502, 503 (and the following ones) are performed at the date and time that are specified into the activation request SMS message.

When the master user answers the call, his terminal Tm sends an answer signaling message to the center MSC (step 504), which forwards it to the server OSA-AS (step 505).

The server OSA-AS then causes the terminal Tm to receive a voice announcement. Such a voice announcement, for instance, could ask the master user to wait until the activation phase is completed. For this purpose, the server OSA-AS sends to the center MSC (step 506) a voice announcement send command, which is forwarded by the center MSC to the device IVR (step 507). The device IVR, upon reception of the voice announcement send command, sends the voice announcement to the terminal Tm (step 508).

The server OSA-AS then commands the connection of the terminal Tm of the master user and the terminal T1 of the first member user and to the terminal T2 of the second member user.

For this purpose, the server OSA-AS sends a call request to the center MSC (step 509), which calls the terminal T1 (step 510). The server OSA-AS also sends a call request to the center MSC (step 509'), which calls the terminal T2 (step 510').

It is assumed that both terminals T1, T2 are accessible and not already engaged in another call.

When the first member user answers the call, his terminal T1 sends an answer signaling message to the center MSC (step 511), which forwards it to the server OSA-AS (step 512). Therefore, the server OSA-AS becomes aware that the first member user answered the call.

According to this embodiment of the present invention, the server OSA-AS then sends a microphone deactivation command to the terminal T1.

Preferably, such a microphone deactivation command may be included either in a microphone deactivation SMS message, or in a microphone deactivation USSD message, as shown in FIG. 5a. In this case, the server OSA-AS sends the microphone deactivation USSD message to the USSD gateway USSD-GW (step 513), which forwards it to the terminal T1 (step 514).

The terminal T1 is adapted to process such a microphone deactivation command and to take consequent actions. In particular, in the embodiment of FIG. 5a, the terminal T1 is adapted to process such a microphone deactivation USSD message and consequently to switch its "mute" function on. Optionally, the terminal T1 may send a microphone deactivation acknowledgment to the server OSA-AS (not shown in FIG. 5a).

As shown in the embodiment of FIG. 5a, the server OSA-AS may stop the voice announcement which the IVR module is sending to the terminal Tm. For this purpose, the server OSA-AS sends a voice announcement stop command to the center MSC (step 515), which forwards it to IVR (step 516). The device IVR then stops sending the voice announcement to the terminal Tm.

The server OSA-AS also sends a voice channel setup command to the center MSC (step 517), so that the center MSC, upon reception of such a voice channel setup command, sets up a voice channel between the terminal Tm and the terminal T1 (step 518), by creating a first leg between MSC and Tm, a second leg between MSC and T1, and by connecting together said first and second legs.

It is noticed that in the present description and in the claims, the expression "voice channel" indicates either a circuit-switch voice channel, in case the conference call service is implemented in a circuit-switched telephone network (PTSTN, GSM, or the like), or a virtual path transporting voice data, when the conference call service is implemented in a packet-switched network (IP, or the like). This latter case will be briefly described herein after by referring to FIGS. 3 and 4.

The master user and the first member user are connected through a bi-directional voice channel. However, according to the present invention, the first member user is not able to speak to the master user, because his terminal T1 has the microphone deactivated. Therefore, according to an aspect of the present invention, it is preferred to inform the master user that the first member user is connected and he is listening, as it will be described in further detail herein after, by referring to FIG. 7.

When the second member user answers the call, his terminal T2 sends an answer signaling message to the center MSC (step 511'), which forwards it to the server OSA-AS (step 512'). Therefore, the server OSA-AS becomes aware that the second member user answered the call.

As for the first member user, the server OSA-AS then sends a microphone deactivation command to the terminal T2.

As for the first member user, preferably such a microphone deactivation command may be included either in a microphone deactivation SMS message, or in a microphone deactivation USSD message as shown in FIG. 5a. In this case, the server OSA-AS sends the microphone deactivation USSD message to the USSD gateway USSD-GW (step 513'), which forwards it to the terminal T2 (step 514').

Also the terminal T2 is adapted to process such a microphone deactivation command and to take consequent actions. In particular, by referring to the embodiment of FIG. 5a, the terminal T2 is adapted to process such a microphone deactivation USSD message and consequently to switch his "mute" function on. Optionally, the terminal T2 may send a microphone deactivation acknowledgment to the server OSA-AS (not shown in FIG. 5a).

The server OSA-AS also sends a voice channel setup command to the center MSC (step 517'), so that the center MSC, upon reception of such a voice channel setup command, sets up a voice channel between the terminal Tm, the terminal T1 and the terminal T2, by creating a third leg between MSC and T2 and by connecting said third leg with the first leg between MSC and Tm and with the second leg between MSC and T1 (step 519).

It should be noticed that in the example of FIG. 5a the server OSA-AS commands the connection of the master user to each member user upon the latter answers the respective call. Alternatively, the server OSA-AS could command the connection of the master user to the member users only after all the member users have answered the respective calls. In this case (which is not shown in the Figures), the master user keeps on receiving the voice announcement from the device IVR until all the member users have answered the respective calls.

Optionally, even though not shown in the Figures, upon reception of the microphone deactivation command, terminals T1 and T2 could also receive, for instance, a voice announcement informing the first and the second member users that they are connected to a conference call, but their microphones are deactivated.

It should also be noticed that in a further embodiment of the present invention, which is not shown in the drawings, the terminal of each user (both master and member), upon reception of the call from the server OSA-AS, could automatically deactivate its own microphone. Then, after the voice channel between the terminals Tm, T1, T2 has been set up (step 519), the server OSA-AS could send a microphone activation command to the terminal Tm. This would advantageously reduce the number of commands to be sent by the server OSA-AS to the terminals.

In any case, according to this embodiment of the present invention, once the voice channels between terminals Tm, T1 and T2 have been set up, only the master user can speak. In fact, upon completion of the activation phase (step 519), only the terminal Tm of the master user has its microphone active, while terminals T1, T2 have their microphones deactivated ("mute" function enabled or switched on).

This results in several advantages.

First of all, none of the member users can speak during and immediately after the activation phase. This is particularly advantageous for instance in case the master user wishes to speak first for introducing the conference call subject without being disturbed, as well as in case a master user has requested a conference call just for broadcasting a voice message to member users, without requesting replies from member users (this particular application will be described in further details herein after).

Moreover, advantageously, environment noises generated by the environments wherein the first and the second member users are located are not transmitted by the respective terminals T1, T2. Therefore, even if, for instance, the first member user is located in a noisy environment, the second member user terminal T2 advantageously receives only the speech and possibly the environment noise transmitted by the terminal Tm, without the environment noise of the first member user.

Figure 5B:
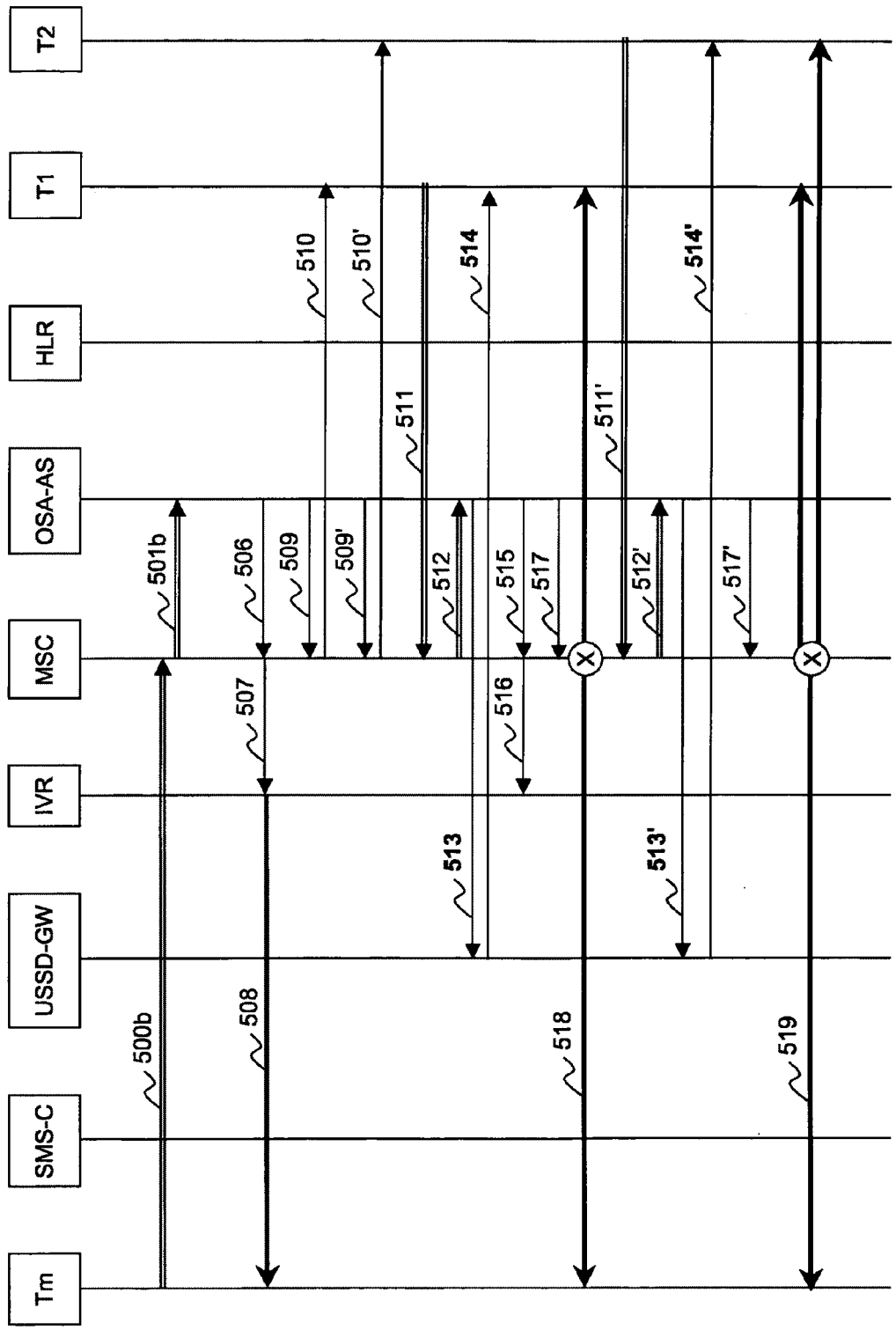

FIG. 5b schematically shows steps of the telephone conference activation phase in the GSM telephone network of FIG. 1, according to a second embodiment of the present invention.

As in FIG. 5a, a master user requests the activation of a conference call, which is then performed in a centralized way by the server OSA-AS of the network. Differently from FIG. 5a, however, the activation request consists in an activation request call to the server OSA-AS, through the center MSC (steps 500b, 501b). In this case, the master user dials a telephone number indicative of the requested telephone service (for instance, "444"), followed by a list number associated to a member list. The server OSA-AS, upon reception of the activation request call, processes the number dialed by the master user, and, as a consequence, it determines that the master user wishes to activate a conference call with the member users comprised into the member list associated to the list number. As already mentioned by referring to FIG. 5a, this requires that the server OSA-AS has the member lists and the respective list numbers stored therein. They can be stored also in a dedicated database or server connected to server OSA-AS.

It can be noticed that, in this second embodiment, the first leg between MSC and Tm has been created at step 500b, when Tm has performed the activation request call.

Once the member users to be connected to the conference call have been determined, the activation phase of the conference call proceeds as already described with reference to FIG. 5a, and as briefly recalled here below.

The server OSA-AS sends a voice announcement start command to the device IVR through the center MSC (steps 506, 507); the device IVR sends a voice announcement to the terminal Tm (step 508); the server OSA-AS calls both the terminal T1 through the center MSC (steps 509, 510) and the terminal T2 through the center MSC (steps 509', 510'); when the first member user answers, the terminal T1 sends an answer signaling message to the server OSA-AS through the center MSC (steps 511, 512); the server OSA-AS sends a microphone deactivation command to the terminal T1 through the gateway USSD-GW (steps 513, 514); the server OSA-AS sends a voice announcement stop command to the device IVR through the center MSC (steps 515, 516); the server OSA-AS sends a voice channel setup command to the center MSC for connecting terminal Tm and terminal T1 (step 517); the center MSC sets up a voice channel between Tm and T1 (step 518), by creating a second leg between MSC and T1 and by connecting each other the first and the second legs; when the second member user answers, the terminal T2 sends an answer signaling message to the server OSA-AS through the center MSC (steps 511', 512'); the server OSA-AS sends a microphone deactivation command to the terminal T2 through the gateway USSD-GW (steps 513', 514'); the server OSA-AS sends a voice channel setup command to the center MSC for connecting terminals Tm, T1, T2 (step 517'), by creating a third leg between Tm and T2 and by connecting the first, the second and the third legs together; the center MSC sets up a voice channel between Tm, T1, T2 (step 519).

The above remarks relating to advantages of the embodiment of FIG. 5a apply also to the embodiment of FIG. 5b, and thus they will not be repeated.

Figure 6:
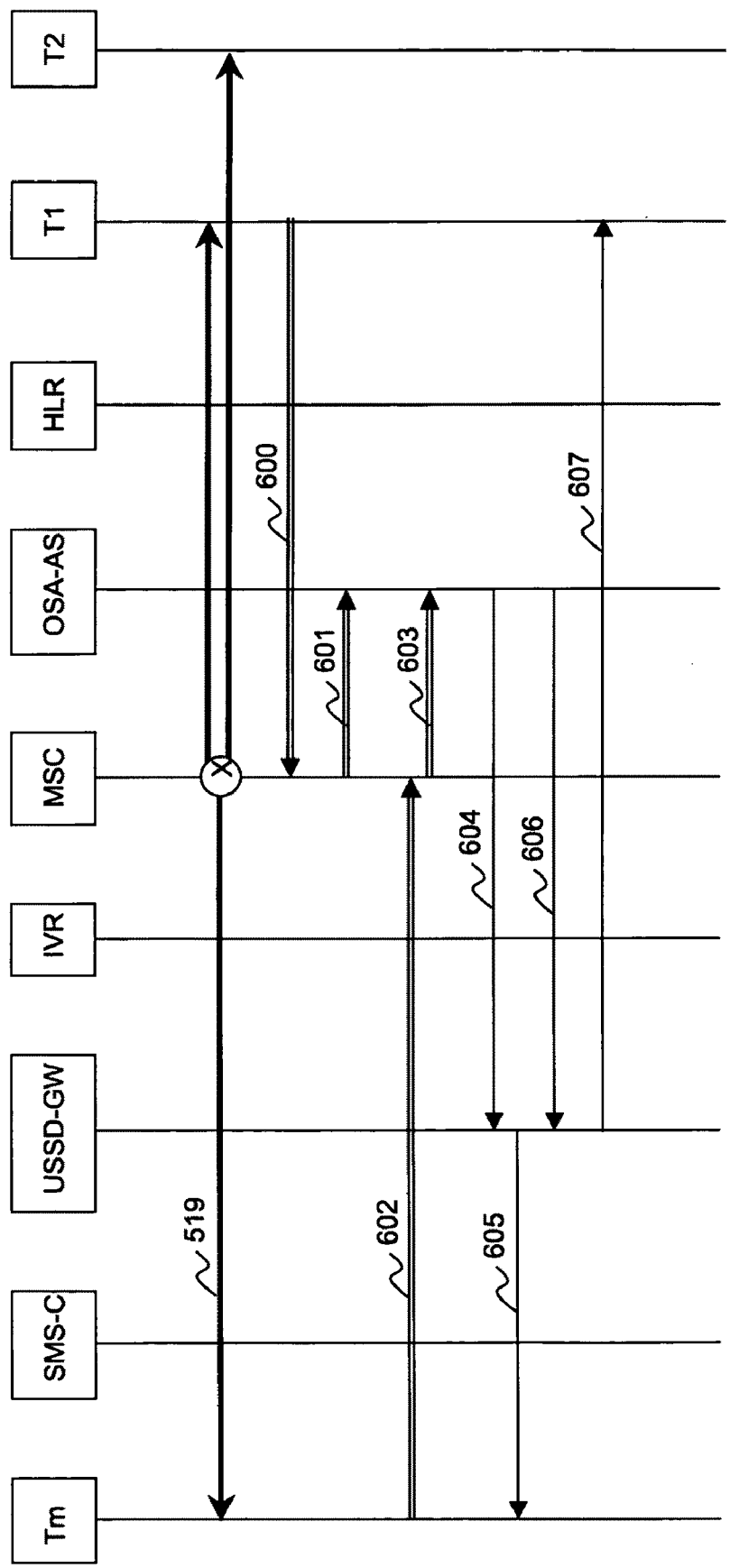
FIG. 6 schematically shows steps for changing a speaker in the telephone network of FIG. 1, according to an embodiment of the present invention.

After the telephone conference between the master user, the first member user and the second member user has been activated (step 519 of either FIG. 5a or FIG. 5b) a need may arise to change the speaker. FIG. 6 shows steps of a phase of change of speaker during a conference call in the GSM telephone network of FIG. 1, according to an embodiment of the present invention.

In FIG. 6, it is assumed that master user, first member user and second member user are connected one with each other, as explained by referring to FIGS. 5a, 5b (in particular, step 519). The master user terminal has its microphone active, so that the master user can speak to the first and the second member user. On the other hand, the terminal microphones of the first and second member users are deactivated (for instance, the "mute" function is enabled in terminals T1, T2), so that member users can not start speaking and thus they can not actively participate to the conference call.

It is now assumed that, while the master user is speaking, the first member user wishes to start speaking. According to an embodiment of the present invention, in order to be allowed to start speaking, the first member user sends an intervention request to the server OSA-AS. For instance, such an intervention request may be generated by the first member user by pressing a predetermined key of the terminal T1 (for instance, the key "#") and transmitted through a DTMF tone to the MSC (step 600), which forwards it to the server OSA-AS (step 601). The server OSA-AS stores such an intervention request. The intervention request may also be generated and transmitted in other ways (for instance, through an SMS message, through an USSD message, or the like).

As the master user stops speaking, according to an embodiment of the present invention, he can allow another user to speak. For this purpose, the master user sends an intervention end message to the server OSA-AS. For instance, such an intervention end message may be generated by pressing a predetermined key of the terminal Tm (for instance, key "*") and transmitted through a DTMF tone to the MSC (step 602), which forwards it to the server OSA-AS (step 603). The server OSA-AS stores such an intervention end message. The intervention end message may be generated and transmitted in other ways (for instance, through an SMS message, through an USSD message, or the like).

The server OSA-AS thus processes the intervention request received from terminal T1 and the intervention end message received from terminal Tm. As a result of the processing, it may determine that the first member user could be allowed to start speaking.

According to an embodiment of the present invention, for this purpose, the server OSA-AS sends a microphone deactivation command to the terminal Tm. For instance, such a microphone deactivation command may be included in a microphone deactivation SMS message, or in a microphone deactivation USSD message as shown in FIG. 6. In such a case, the server OSA-AS sends the microphone deactivation USSD message to the gateway USSD-GW (step 604), which forwards it to the terminal Tm (step 605).

Also the terminal Tm is adapted to process such a microphone deactivation command and to take consequent actions. In particular, by referring to FIG. 6, the terminal Tm is adapted to process such a microphone deactivation USSD message and to enable its "mute" function. Optionally, the terminal Tm may send a microphone deactivation acknowledgment to the server OSA-AS (not shown in FIG. 6).

The server OSA-AS sends a microphone activation command to the terminal T1. For instance, such a microphone activation command may be included in a microphone activation SMS message, or in a microphone activation USSD message as shown in FIG. 6. In such a case, the server OSA-AS sends the microphone activation USSD message to the gateway USSD-GW (step 606), which forwards it to the terminal T1 (step 607).

The terminal T1 is adapted to process such a microphone activation command and to take consequent actions. In particular, by referring to FIG. 6, the terminal T1 is adapted to process such a microphone activation USSD message and to disable its "mute" function (mute function is switched off). Optionally, the terminal T1 may send a microphone activation acknowledgment to the server OSA-AS (not shown in FIG. 6).

Thus, it can be noticed that, advantageously, according to this embodiment of the present invention, a user may start speaking during a conference call only by sending an intervention request to the server OSA-AS. Such an intervention request is processed by the server OSA-AS, who will keep it stored without performing any other action until the user who is currently speaking stops speaking and sends an intervention end message to the server OSA-AS. Therefore, advantageously, a user will not be able to interrupt another user who is speaking.

Moreover, if two users wish to start speaking substantially at the same time, according to an embodiment of the present invention, each user sends to the server OSA-AS a respective intervention request (this case is not shown in the drawings). The server OSA-AS, upon reception of the intervention end message from the user who is speaking, will determine who may start speaking. Such a decision may be taken according to different criteria. For instance, the user who will be allowed to speak could be the user who first sent the intervention request or the user with higher priority, etc.

Therefore, advantageously, according to this embodiment, the situation wherein two users try to speak at the same time is avoided.

Moreover, as only the user who is speaking has the microphone active, advantageously it is substantially avoided that environment noises of the listening users affect the speech of the speaking user.

Moreover, it can be noticed that the speaker change phase according to the embodiment of the present invention described above is rather quick, since no change is required in voice channels, in particular no change is required in the transmission direction of voice channels, since they are always bi-directional. Indeed, the speaker change simply requires to enable/disable the "mute" function of the terminals, which is a particularly simple and quick operation.

In FIG. 6, a situation is shown wherein only a single user has the microphone of its terminal active, while all the other users have their microphones deactivated. According to other embodiments (not shown in the drawings), the terminal of the master user and also one or more of the terminals of the member users have their microphones active.

However, according to other embodiments of the present invention, which are not shown in the drawings, more users (member or master) may have their terminal microphone active at the same time. In particular, one or more users may have always their microphone active, independently of the fact that they are speaking or listening. These users are marked at the server OSA-AS as "privileged" users, and the server OSA-AS never sends to their terminals any microphone deactivation command.

On the other hand, according to other embodiments of the present invention, which are not shown in the drawings, one or more predefined member users may have their microphone always deactivated, since they are connected to the conference call as only-listening users. In such a case, these predefined users are marked at the server OSA-AS as "listeners", whose possible intervention requests must be ignored.

According to other embodiments of the present invention, which are not shown in the drawings, the above described speaker change may be managed by one of the users connected to the conference call, who can be designed as "owner user". In these embodiments, intervention requests and intervention end messages are sent to such an owner user. The owner user, according to the received requests/messages, determines the user who is allowed to start speaking, and sends the appropriate microphone activation/deactivation commands through his own terminal to the terminals of the other users. Therefore, while in the embodiment of FIG. 6 the role of conference call server is played by the server OSA-AS, in these latter embodiments the role of conference call server is played by the owner user.

Moreover, according to other embodiments of the present invention, which are not shown in the drawings, any listening user may perform an urgent intervention by sending to the server OSA-AS an urgent intervention request. In this case, upon reception of the urgent intervention request, the server OSA-AS immediately starts a speaker change to allow the user who sent the urgent intervention request to start speaking without waiting that the currently speaking user has stopped speaking. The urgent intervention request may be transmitted through a DTMF tone, an SMS message, an USSD message or the like. Alternatively, any listening user may perform an urgent intervention by manually activating its own microphone and starting speaking; in this case, such a user may send a urgent intervention notification to the server OSA-AS after he has started speaking. All the users of a conference call or a subset of users of a conference call may be enabled to perform urgent intervention.

Advantageously, according to an embodiment of the present invention, the master and the member users may be informed about the identity of the listening users and the speaking user. Advantageously, according to embodiments of the present invention, this may be implemented by sending participant lists to both the master user and the member users.

Figure 7:
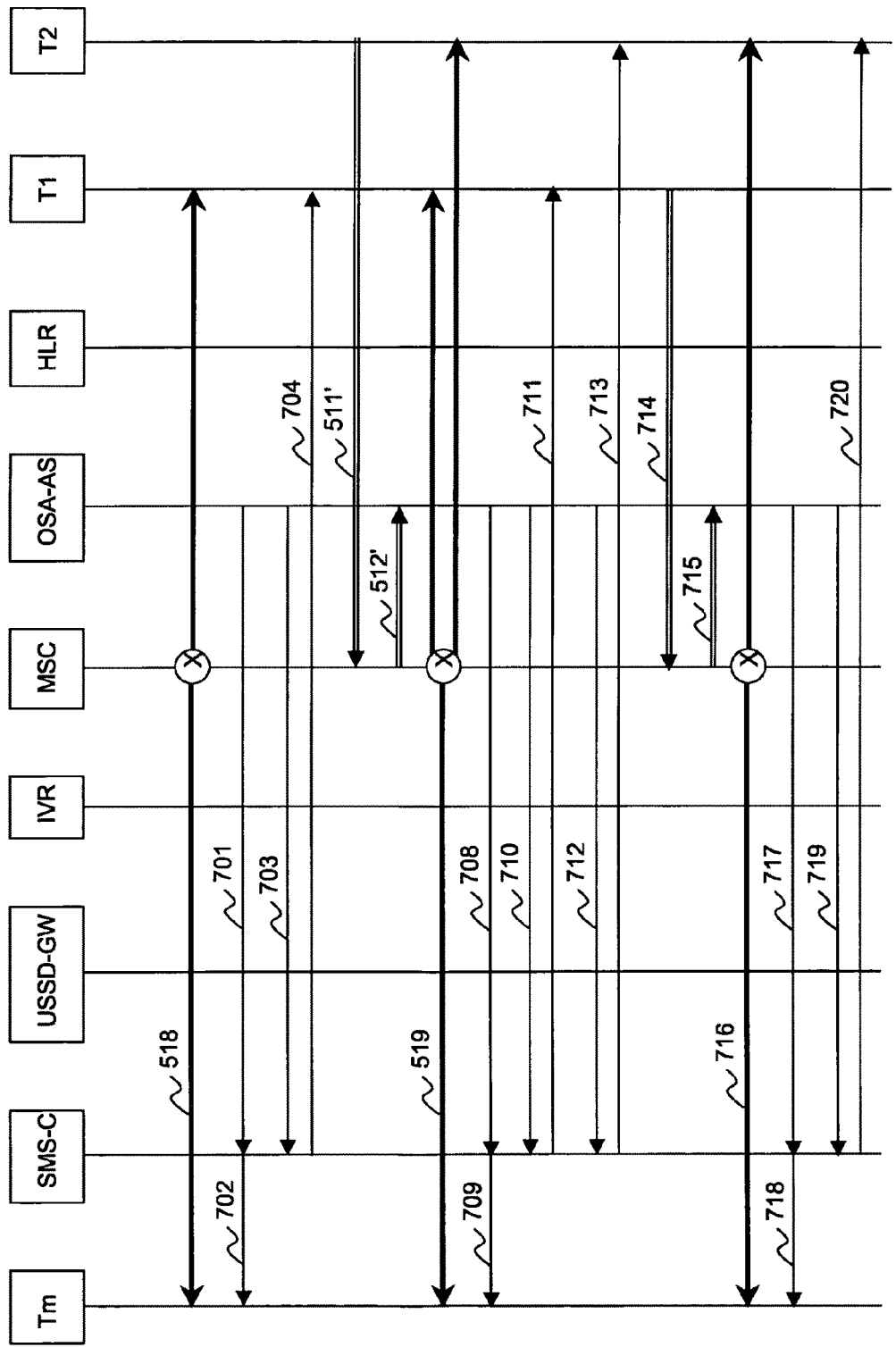
FIG. 7 schematically shows steps for transmitting a participant list in the telephone network of FIG. 1, according to an embodiment of the present invention.

FIG. 7 schematically shows steps of a participant list transmission procedure during a conference call according to an embodiment of the present invention.

In FIG. 7, it is assumed that an activation phase of a conference call like the one shown in FIG. 5a or 5b is ongoing, i.e. a master user, through its own terminal Tm, requests the activation of a conference call with a first and a second member users, each member user being connected to the telephone network through a respective terminal T1, T2.

By referring back to step 518 of FIGS. 5a, 5b, during such a step the terminal Tm and the terminal T1 are connected with each other by a voice channel, and the master user and the first member user are waiting for the second member user to be connected to the conference call. The steps preceding step 518 are not shown in FIG. 7 for clarity.

As already mentioned, when terminal Tm and terminal T1 are connected during step 518, the microphone of terminal T1 is deactivated. Therefore, in this situation, the master user is not aware that he is connected to the first member user, since his terminal Tm does not receive any signal (neither speech nor environment noise) from terminal T1. Therefore, the master user may be discouraged from starting speaking to the first member user, since he has the impression that the telephone line is not active.

Similarly, by still referring back to FIG. 5a, when T2 is connected to Tm and T1 during step 519, the microphone of T2 is deactivated. Therefore, in this situation, the master user and the first member user are not aware that they are connected to the second member user, since their respective terminals Tm, T1 do not receive any signal (neither speech nor environment noise) from terminal T2. Therefore, the master user may be discouraged from starting speaking to the first and the second member users, since he still has the impression that the telephone line is not active.

FIG. 7 shows a solution to overcome the above drawback according to an embodiment of the present invention.

In particular, in FIG. 7, after terminal T1 has been connected to terminal Tm (step 518), the server OSA-AS sends a participant list to the terminal Tm. Such a participant list comprises a list of identifiers of the member users who have already answered the call from the server OSA-AS, and who are then already listening with the microphones of their terminals deactivated. Preferably, the participant list also comprises the master user identifier. The identifiers of the member users could comprise names of such users. In order to build such a participant list, the server OSA-AS may access a database comprising, for each user, information such as its nickname, its first name and last name, its telephone number and so on.

For instance, such a participant list may be sent through an SMS message, preferably through a "flash" SMS message which will be directly displayed on the terminal display. Such an SMS message is sent from OSA-AS to the center SMS-C (step 701), which forwards it to terminal Tm (step 702). In this way, the master user is informed about the fact that the first member user is already connected and he is listening. Therefore, the master user may start speaking to the first user member, even though he does not receive any signal from terminal T1.

Similarly, the server OSA-AS sends an SMS message comprising the participant list to the terminal T1. Such an SMS message is sent to the center SMS-C (step 703), which forwards it to terminal T1 (step 704). In this way, the first member user is informed about the identity of the master user before he starts speaking.

When the second member user answers the call from the server OSA-AS (step 511', 512', already described with reference to FIG. 5a, not shown in FIG. 7), the server OSA-AS sends a microphone deactivation command to terminal T2 (steps 513', 514', already described with reference to FIG. 5a, not shown in FIG. 7).

The server OSA-AS then connects the terminal T2 of the second user to the terminal Tm of the master user and to the terminal T1 of the first member user (step 519).

In the embodiment of FIG. 7, after terminal T2 has been connected to terminals Tm and T1, the server OSA-AS sends an updated participant list to the terminal Tm of the master user. Such an updated participant list then comprises the master user identifier, the first member user identifier and the second member user identifier.

Also in this case, the updated participant list may be sent through SMS messages, preferably through "flash" SMS messages. A first SMS message comprising the participant list is sent to the center SMS-C (step 708), which forwards it to the terminal Tm (step 709). In this way, the master user is informed about the fact that both the first member user and the second member user are now connected and they are listening. Therefore, the master user may start speaking to the first member user and the second member user, even though he does not receive any signal neither from terminal T1 nor from terminal T2.

Similarly, the server OSA-AS sends a second SMS message comprising the participant list to the terminal T1 of the first member user. Such a second SMS message is sent to the center SMS-C (step 710), which forwards it to terminal T1 (step 711). In this way, the first member user is informed about the fact that also the second member user is now listening.

Similarly, the server OSA-AS sends a third SMS message comprising the participant list to the terminal T2. Such a third SMS message is sent to the center SMS-C (step 712), which forwards it to terminal T1 (step 713). In this way, the second member user is informed about the identities of the master user and of other member users already connected to the conference call (in this case, only the first member user).

Sending participant lists according to this embodiment of the present invention is advantageous also in other situations. For instance, during a conference call a user (either member or master) may leave the conference call by hanging up his terminal. FIG. 7, for instance, shows a situation wherein the first member user leaves the conference call by hanging up his terminal T1. When the terminal T1 is hung up, it sends an hang-up signaling message to the server OSA-AS through the center MSC (steps 714, 715). The center MSC then removes the voice channel between terminal T1 and terminals Tm and T2 (step 716).

In this case, the server OSA-AS, according to an embodiment of the present invention, sends to the master user an updated participant list. Such an updated participant list then includes the master user identifier and the second member user identifier.

Also in this case, the updated participant list may be sent through an SMS message, preferably through a "flash" SMS message. Such an SMS message is sent to the center SMS-C (step 717), which forwards it to terminal Tm (step 718). In this way, the master user is informed about the fact that the first member user is no more connected to the conference call. Therefore, the master user may continue speaking to the second member user only.

Similarly, the server OSA-AS sends an SMS message comprising the updated participant list to the terminal T2 of the second member user. Such an SMS message is sent to the center SMS-C (step 719), which forwards it to the terminal T1 (step 720). In this way, also the second member user is informed about the fact that the first member user is no more connected to the conference call.

Therefore, advantageously, according to this embodiment of the present invention, users connected to a conference call (both master and members) may be informed about the fact that a new user has joined the conference call or about the fact that a user has left the conference call.

For simplicity, in FIG. 7 it has been assumed that the master user is speaking, and no speaker change occurs. However, participant lists may be useful also for informing users about a speaker change (as shown in FIG. 6). Indeed, according to embodiments of the present invention, an updated participant list may be sent to all the users connected to a conference call whenever a speaker change occurs. In this case, the speaking user should be marked into the participant list through a predetermined marker (for instance, "*"). In case of speaker change, an updated participant list should be sent to all users. In the updated list, the marker is moved next to the identifier (possibly, the name) of the new speaker.

Figure 8:
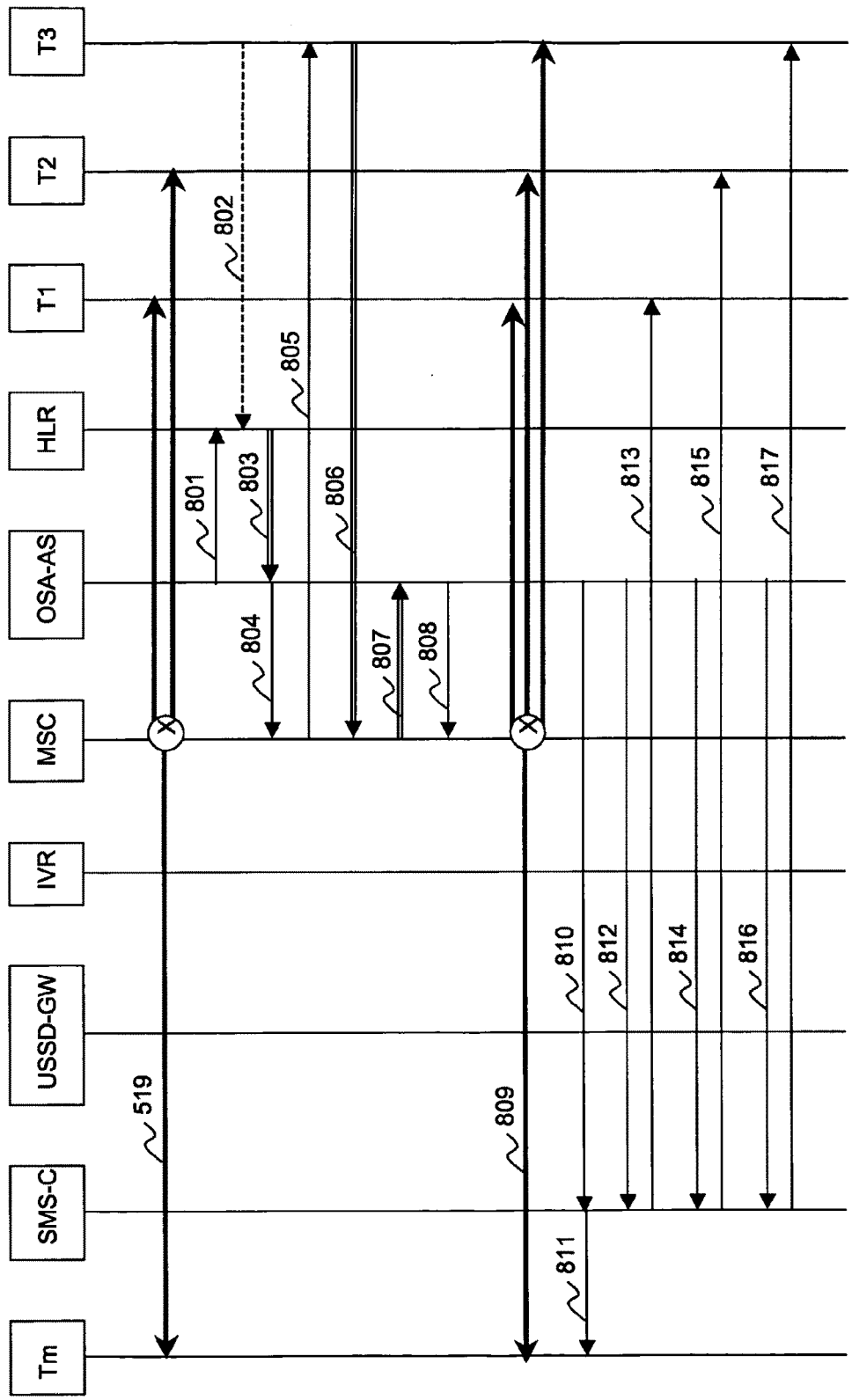
FIG. 8 schematically shows steps of a location-based telephone conference service according to an embodiment of the present invention.

FIG. 8 shows steps of a particular service which can be implemented in a telephone network implementing the method according to an embodiment of the present invention.

According to this embodiment, in a cellular telephone network (for instance, the GSM telephone network of FIG. 1), it is possible to provide a conference call service, wherein only users located within a predefined cell or within a cell set are joined to the conference call.

Therefore, according to this embodiment, when the master user requests the activation of a conference call with a certain member list, he also has to specify one predefined cell o cell set to which the conference call is addressed. The server OSA-AS, before calling the single member users of the list, checks the geographic position of each member user, and actually calls only users who are located into the predefined cell o cell set.

According to this embodiment, a member user of the list who enters the predefined cell o cell set after the conference call has been activated will become automatically connected to the conference call. This latter situation is shown in further details in FIG. 8.

In FIG. 8 it is assumed that a master user has requested a conference call with a first, a second and a third member users, under the condition that they are located in a predefined cell. For simplicity, FIG. 8 does not show the activation phase, which is similar to the one of FIG. 5a or FIG. 5b.

It is assumed that terminals T1, T2 of the first and second member users, when activation begins, are located in the target predefined cell. Therefore, at the end of the activation phase (step 519), terminals Tm, T1 and T2 are connected each other. It is further assumed that during the activation phase, the terminal T3 of the third member user is not located in the target predefined cell. Therefore, terminal T3 is not connected to the conference call.

Therefore, according to an embodiment of the present invention, the server OSA-AS sends a notification request to the register HLR, i.e. it sends to the register HLR the identifiers of the member users who has not been connected to the conference call yet, since they are not located in the predefined cell (in this case, only the third member user was not located in the target cell), and it asks the register HLR to check whether one of these users enters the predefined cell. Such a notification request (step 801) may be based on the MSISDN of the users.

It is now assumed that the third member user enters the predefined cell with his terminal T3. The register HLR, by performing its checks, becomes aware that the terminal T3 of the third member user has entered the predefined cell (step 802), and then sends a notification to the server OSA-AS (step 803). The server OSA-AS, upon reception of the notification, calls the terminal T3 through the center MSC (steps 804, 805).

When the third member user answers the call, his terminal T3 sends an answer signaling message to the center MSC (step 806), which forwards it to the server GSA-AS (step 807). The server GSA-AS then sends a voice channel setup command to the center MSC (step 808) for connecting terminal T3 to terminals Tm, T1 and T2. The center MSC then sets up a voice channel among Tm, T1, T2, T3, so that the third member user is joined to the conference call.

Then, optionally, the server OSA-AS may send an updated participant list to terminals Tm, T1, T2, T3 through respective "flash" SMS messages, as described by referring to FIG. 7.

In particular, the server OSA-AS sends a first SMS message comprising the updated participant list to the terminal Tm of the master user through the center SMS-C (steps 810, 811). The server OSA-AS then sends a second SMS message comprising the updated participant list to the terminal T1 of the first member user through the center SMS-C (steps 812, 813). The server OSA-AS then sends a third SMS message comprising the updated participant list to the terminal T2 of the second member user through the center SMS-C (steps 814, 815). The server OSA-AS then sends the SMS message to the terminal T3 of the third member user through the center SMS-C (steps 816, 817).

Therefore, the master user and the first and second member users are informed about the fact that the third user has now joined the conference call and he is listening. Similarly, the third users is informed about the master user identity and about the identity of the already connected member users.

Alternatively, the role of the register HLR may be played by a location server included in the network, which provides more detailed information about the geographic position (i.e. geographic coordinates) of the terminals in a predetermined area.

The method of managing a conference call according to the present invention could allow implementing of further services, which are not shown in the drawings. For instance, such a method allows implementing of a "message broadcasting" service, i.e. a service wherein a master user requests to be connected to a plurality of member users in order to transmit them a voice message.

In such a case, the activation phase may be similar to the one shown in FIGS. 5a and 5b. In particular, during activation, each member user, before being connected to the master user, receives on his terminal a microphone deactivation command. Therefore, at the end of the activation phase, the master user is connected to the plurality of member users, who can only listen, as their microphones are deactivated. In this way, advantageously, the master user can transmit his voice message, thus reducing the risk of being interrupted by a member user, and without the risk that environment noise of member users affects his speech.

The method according to the present invention has many advantages. First of all, it can be implemented in a known telephone network, without the need of modifying existing devices and apparatuses, and without the need of providing the network with complex and costly additional equipment for managing the conference. In particular, the microphone activation/deactivation operation is particularly simple, as the "mute" function is typically present on known terminals. Further, known mobile terminals are typically able to support both SMS service and USSD service, which, according to preferred embodiments of the present invention, may be used for transmitting microphone activation/deactivation commands and intervention requests/intervention end messages in a mobile telephone network.

Therefore, according to the present invention, it is only required to provide terminals with a suitable client application, which is adapted to interact with the server OSA-AS. Such a client application may for instance be stored on a SIM card of a mobile terminal, or alternatively it can reside into the memory of the mobile terminal. The client application may be, for instance, based on Java or Symbian platforms.

In particular, the client application may receive from the server OSA-AS the microphone activation/deactivation commands and may execute them by suitably enabling/disabling the "mute" function of the terminal. Further, such a client application may send to the server OSA-AS suitable signaling messages when the terminal user presses the key of intervention request or intervention end message.

Further, such a client application may, for instance, display on the screen of the mobile terminal an interactive menu, through which the terminal user may see the participant list, the speaking user, and may also perform actions such as sending an intervention request or an urgent intervention request. In such a case, the terminal should be provided with a graphic user interface, for selecting the various options of the interactive menu. Profitably, the mobile terminal should be provided with a hand-free function or with a earpiece, so that the terminal user may be able to listen, speak and look at the terminal screen or operate upon keys and graphic user interface at the same time.

Such a client application may be adapted to perform additional tasks, such a playing sounds (for instance, when a new "flash" SMS message is displayed on the terminal screen).

Moreover, advantageously, it can be seen that thanks to the present invention it is possible to increase the number of users connected to a same conference call in comparison with present conference call services. This is due to the fact that, in the method according to the present invention, the voice channel quality is almost independent of the number of users of a conference call. Moreover, the speaker change according to embodiments of the present invention allows to manage in an organized way the interventions of the users, even in case the number of users connected to the conference call is particularly high (for instance, some tens of users).

Moreover, it has to be noticed that the method according to the present invention can be implemented so as to substantially avoid interference with the voice channel, since messages, requests and/or commands for managing the various phases (activation, speaker change, etc.) are preferably transmitted by using services such as USSD, SMS, which are implemented on signaling channels. During the conference call, then, the voice channel is always dedicated exclusively for transporting user speech, with no interruption.

The method according to the present invention can be implemented according to other embodiments. For instance, according to an embodiment of the invention, it is provided a method of managing a conference call with the addition of images.

Figure 2:
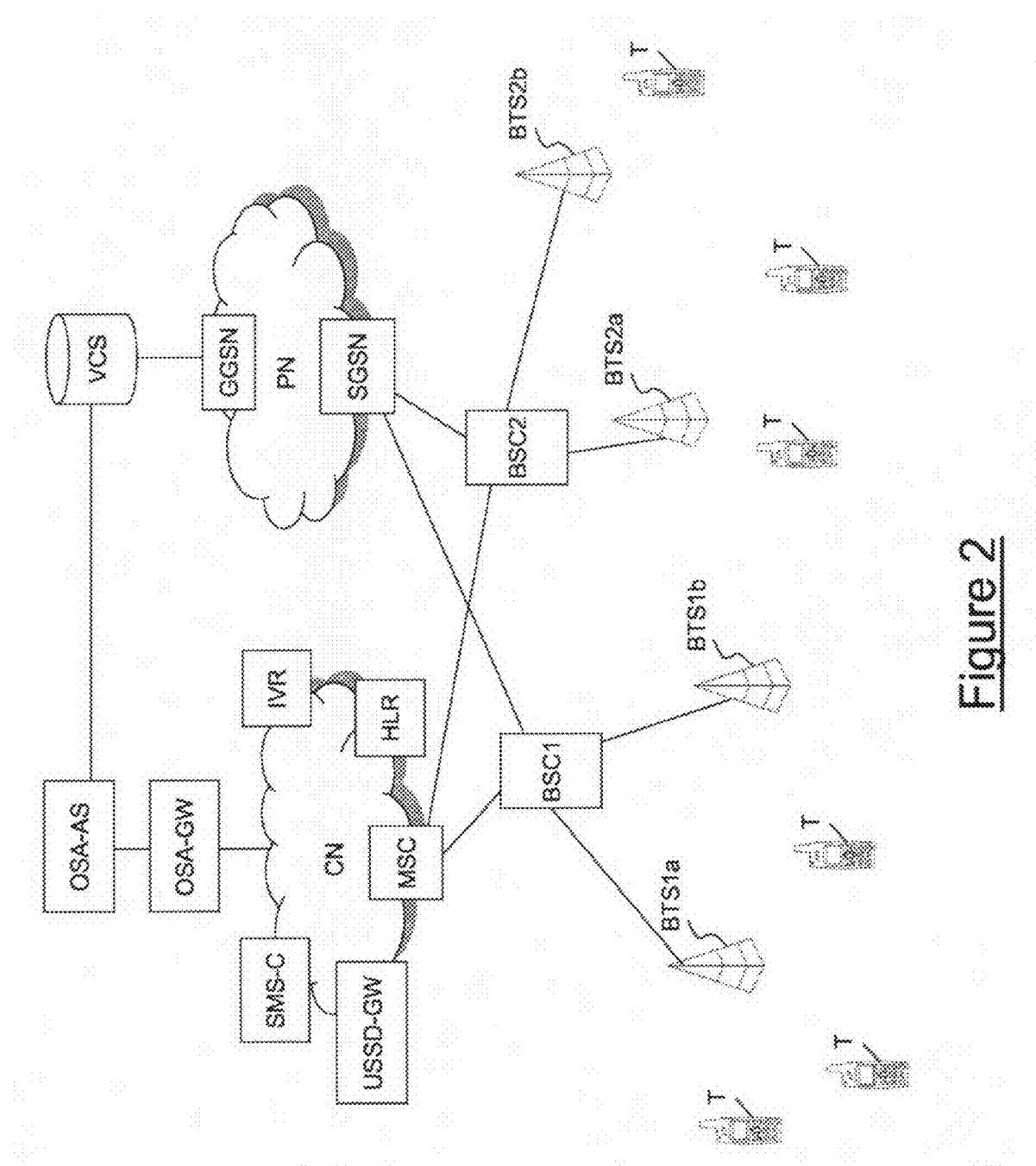
FIG. 2 schematically shows a second example of a known GSM telephone network, which is adapted to implement embodiments of the present invention.

FIG. 2 schematically shows a GSM telephone network similar to the one of FIG. 1, which is adapted to support such a conference call service with the addition of images. In particular, the GSM telephone network shown in FIG. 2 is connected to a Video Content Server VCS (typically on a packet-switched network), which is a database comprising images (for instance pictures, maps, drawings, or the like) which may be sent from a user to other users during a conference call. The server VCS is connected to the server OSA-AS, which uses its content to configure the conference call service with images. The server VCS is further connected to a packet-switched network PN (for instance a GPRS network), which is provided with two interfaces. A first interface, which is termed Serving GPRS Support Node SGSN, is adapted to interface the network PN to the base station controllers BSC1, BSC2. A second interface, which is termed Gateway GPRS Support Node GGSN is adapted to interface the network PN and the server VCS. The conference call service is implemented as described above by referring to FIGS. 5a, 5b, 6, 7, 8. At the same time, the packet-switched network PN distributes the appropriate images from the server VCS to the users connected to the conference call.

More particularly, a user, while speaking during a conference call, could wish to send an image to the listening users. In this case, the client application of the speaking user terminal sends such an image to the server VCS through the packet-switched network PN. Besides the image, the client application could send also the identifiers (i.e. the addresses) of the listening users to which the image is addressed. Therefore the server VCS, upon reception of the image from the speaking user, forwards it to all the listening users specified by the speaking user through the packet switched network PN.

As already mentioned, even if the above embodiments of the present invention are all referred to a GSM telephone network, the present invention may be applied also to other types of telephone networks, both fixed and mobile.

Figure 3:
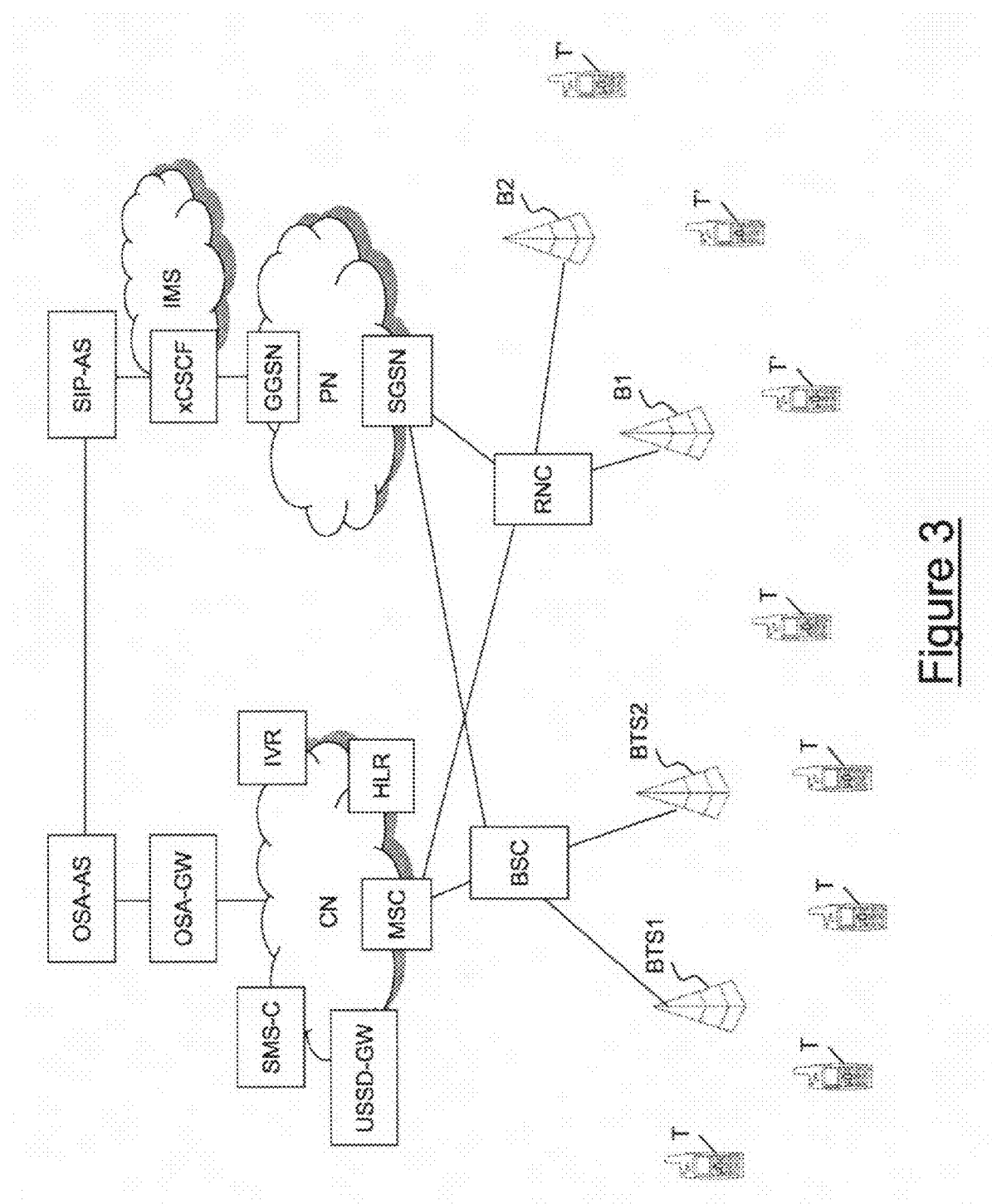
FIG. 3 schematically shows a first example of a known telephone network comprising an UMTS sub-network, which is adapted to implement embodiments of the present invention.

For instance, FIG. 3 shows a telephone network comprising a GSM sub-network and a UMTS ("Universal Mobile Telephone System") network.

UMTS networks are adapted to support both voice traffic and data traffic at particularly high rates (up to 1920 kbit/s).

The network of FIG. 3 comprises a GSM sub-network in turn comprising a base station controller BSC and two base transceiver stations BSC1, BSC2, which are radio connected to a plurality of GSM terminals T. The GSM sub-network will not be described in further details, since it is similar to the network of FIG. 1.

The UMTS sub-network comprises a radio network controller RNC, which substantially acts as a base station controller BSC in GSM networks. The radio network controller RNC is connected to two Nodes-B B1, B2, each Node-B substantially acting as a base transceiver station in GSM networks. The nodes-B B1, B2 are radio connected to a plurality of UMTS terminals T'.

The radio network controller RNC interfaces both with the circuit-switched network CN through the center MSC, and with a packet-switched network PN.

The packet-switched network PN is provided with a Serving GPRS Support Node SGSN and with a Gateway GPRS Support Node GGSN. The node SGSN acts as an interface between the network PN and the radio network controller RNC. On the other side, the node GGSN acts as an interface between the network PN and an IP Multimedia Subsystem (IMS). The subsystem IMS allows a service provider to develop and provide a plurality of multimedia services, as in an IP network. In particular, a subsystem IMS comprises Call/Session Control Functions xCSCF, which act as gateway functions between the network PN and an application server SIP-AS. The function of an application server SIP-AS is similar to the function of an OSA-AS in GSM networks.

Therefore, the telephone network of FIG. 3 is adapted to implement the method of managing a conference call according to embodiments of the present invention, wherein users may be connected either by GSM terminals T or by UMTS terminals T'.

In such an embodiment, the conference call may be managed by the inter-working of the server OSA-AS and the server SIP-AS.

Moreover, intervention requests and/or intervention end messages as well as microphone activation/deactivation commands may be transmitted at least partially by the SIP protocol. In conference calls supported by the telephone network of FIG. 3, a speech will be transmitted by the circuit-switched network CN, while messages, requests and commands may be transmitted partially by the packet-switched network PN and partially by the circuit-switched network CN.

Figure 4:
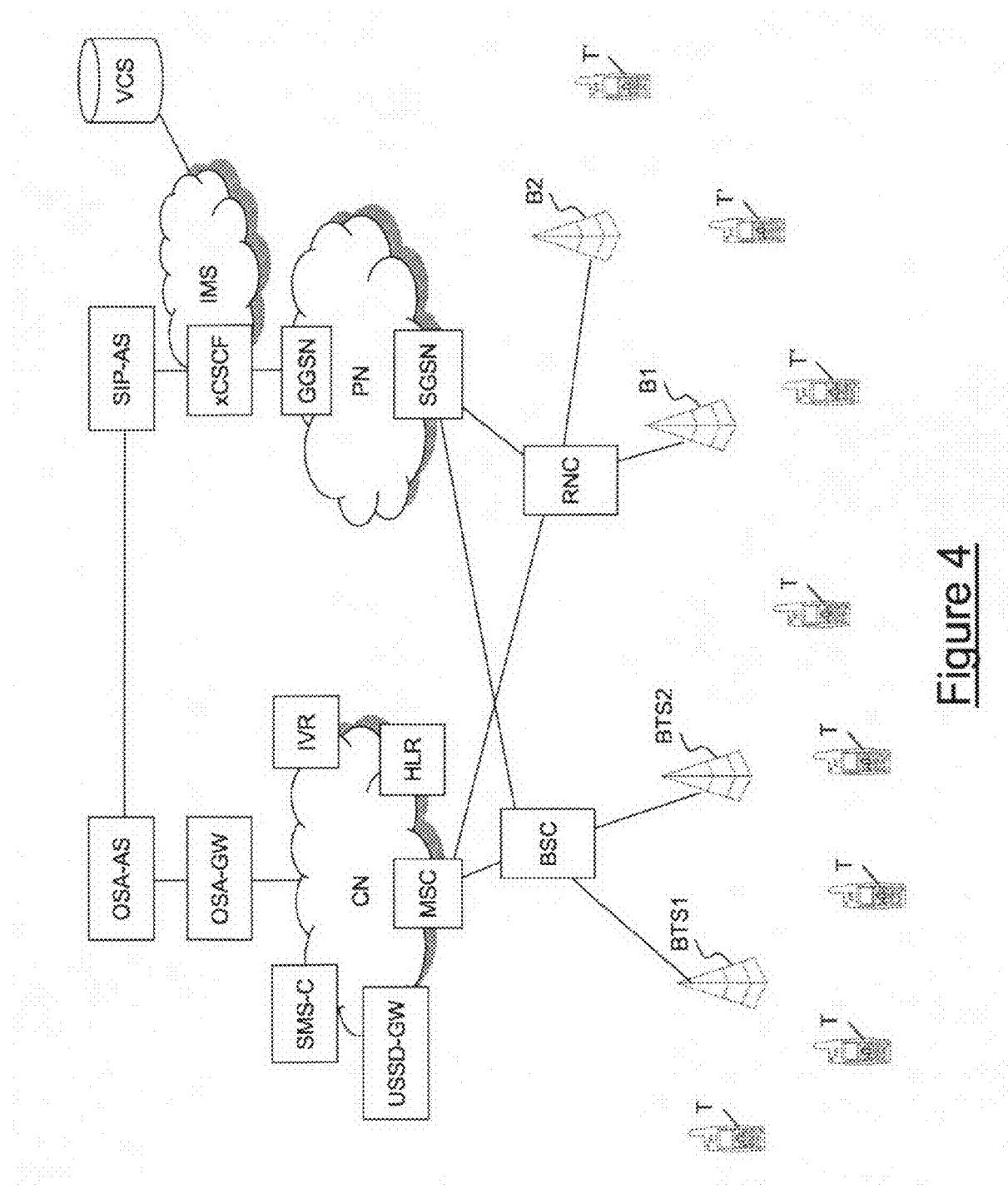
FIG. 4 schematically shows a second example of a known telephone network comprising an UMTS sub-network, which is adapted to implement embodiments of the present invention.

FIG. 4 shows a telephone network similar to the one of FIG. 3, which is adapted to support a conference call service with the addition of images, according to another embodiment of the present invention. In FIG. 4, the telephone network of FIG. 3 is further connected to a Video Content Server VCS, whose function has already been explained with reference to FIG. 2. The VCS is associated to the IMS network. The operation of such a telephone network is similar to the network of FIG. 3. The only difference is that the packet switched network is further adapted to transmit images to users connected to a conference call.

The present invention may be applied in different fields, such as, for example:
police forces;
civil defense;
transport companies (carrier companies, taxi companies, etc.); or
business application.

The invention claimed is:

1. A method of managing, in a mobile telephone network, a conference call among a first terminal and a plurality of terminals, comprising:
setting up at least one voice channel for activating said conference call among said first terminal and said plurality of terminals;
sending a conference call signal to the plurality of terminals;
receiving a return signal from a responding terminal of said plurality of terminals; and
sending a microphone deactivation signal to the responding terminal in response to receiving the return signal from the responding terminal to deactivate a microphone of the responding terminal so that the microphone remains deactivated during an activating phase of said conference call,
wherein setting up at least one voice channel is performed by sending a conference call activation request by said first terminal and comprises sending said conference call activation request to a conference call server through a signaling channel of the mobile telephone network, thereby avoiding interference with said at least one voice channel.

2. The method according to claim 1, wherein said conference call server sends a voice channel set up command for setting up said voice channel among said first terminal and said plurality of terminals, based on said conference call activation request.

3. The method according to claim 1, wherein said sending a microphone deactivation signal to the responding terminal comprises sending a microphone deactivation signal from said conference call server to the responding terminal.

4. The method according to claim 3, wherein said sending a microphone deactivation signal is performed before setting up said voice channel among said first terminal and said plurality of terminals.

5. The method according to claim 3, wherein said sending a microphone deactivation signal is performed after setting up said voice channel among said first terminal and said plurality of terminals.

6. The method according to claim 1, wherein said sending a microphone deactivation signal to the responding terminal comprises sending a microphone deactivation signal from said first terminal to the responding terminal.

7. The method according to claim 1, wherein said setting up at least one voice channel among said first terminal and said plurality of terminals is performed at a conference call activation date and at a conference call activation time.

8. The method according to claim 1, wherein the responding terminal of said plurality of terminals having its microphone deactivated sends an intervention request, wherein said intervention request is processed, and wherein the microphone of said responding terminal of said plurality of terminals is activated in case said intervention request is accepted.

9. The method according to claim 8, wherein said intervention request is processed by comparing it with an intervention end message previously sent by a terminal having its microphone activated.

10. The method according to claim 8, wherein said intervention request is processed at said conference call server and wherein said conference call server causes activation of the microphone of said responding terminal of said plurality of terminals.

11. The method according to claim 1, wherein said intervention request is processed by said first terminal and wherein said first terminal causes activation of the microphone of said responding terminal of said plurality of terminals.

12. The method according to claim 1, further comprising a step of sending a participant list to said plurality of terminals and to said first terminal, said participant list comprising identifiers of users of said plurality of terminals which are connected to said at least one voice channel.

13. The method according to claim 12, wherein said participant list comprises an identifying marker for identifying a current speaker.

14. The method according to claim 1, wherein said conference call activation request comprises an identifier of at least one cell of the mobile telephone network.

15. The method according to claim 14, further comprising, before performing said step of setting up said at least one voice channel among said first terminal and said plurality of terminals, checking which of said plurality of terminals is located in said at least one cell.

16. The method according to claim 14, further comprising, after having performed said step of setting up at least one voice channel, a step of checking whether terminals of said plurality of terminals which were not located in said at least one cell before setting up said voice channel, enter said at least one cell, and, if so, a step of connecting said terminals to said at least one voice channel.

17. The method according to claim 1, further comprising sending an image file to at least one of said plurality of terminals.

18. The method according to claim 1, wherein said first terminal is enabled to have an active microphone.

19. A non-transitory computer-readable storage medium encoded with a computer program comprising computer program code portions for perfoiming the steps of claim 1, when said program is run on a computer.

20. A conference call server for executing the computer program of claim 19.

21. A terminal of a plurality of terminals used in a mobile telephone network and adapted to participate in a conference call between a first terminal and the plurality of terminals, comprising:
- a receiver module for receiving a conference call signal from a conference call server;
- a transmitter module for transmitting a return signal to the conference call server,
- wherein the receiver module is further configured for receiving, through a signaling channel, a microphone deactivation command from the conference call server after transmitting the return signal to the conference call server, the microphone deactivation command being sent by the conference call server in response to receiving the return signal from the transmitter module; and
- an executing module for executing said microphone deactivation command so that a microphone of the terminal remain deactivated during an activating phase of said conference call,
- wherein said receiver module is further configured for receiving, through the signaling channel, a microphone activation command from the conference call server, and
- wherein the executing module is further configured for executing said microphone activation command.

22. The terminal according to claim 21, wherein said executing module is adapted to enable a mute function of said terminal upon reception of said microphone deactivation command and is further adapted to disable said mute function of said terminal function upon reception of said microphone activation command.

23. The terminal according to claim 21, wherein the transmitter module further adapts said terminal to transmit an intervention request, and further adapts said terminal to transmit an intervention end message.

24. The terminal according to claim 21, wherein said terminal comprises a memory for storing a list of identifiers of said plurality of terminals which are to be connected to said conference call, and a list of identifiers associated with said list.

25. The terminal according to claim 21, wherein said receiver module is further adapted to receive a participant list, said participant list comprising identifiers of terminals connected to said conference call.

\* \* \* \* \*